US012670183B2

(12) United States Patent
Pai et al.

(10) Patent No.:  US 12,670,183 B2
(45) **Date of Patent:       \*Jun. 30, 2026**

(54) METHODS AND SYSTEMS FOR SYNCHRONIZING COMMUNICATION RECORDS IN COMPUTER NETWORKS BASED ON DETECTING PATTERNS IN CATEGORIES OF METADATA

(71) Applicant: Capital One Services, LLC, McLean, VA (US)

(72) Inventors: Aditya Pai, Brooklyn, NY (US); Brice Elder, Allen, TX (US); Niyati Shah, Pleasanton, CA (US); Marek Sedlacek, San Francisco, CA (US)

(73) Assignee: Capital One Services, LLC, McLean, VA (US)

( \* ) Notice: Subject to any disclaimer, the term of this patent is extended or adjusted under 35 U.S.C. 154(b) by 52 days.

This patent is subject to a terminal disclaimer.

(21) Appl. No.: 18/638,078

(22) Filed: Apr. 17, 2024

(65) Prior Publication Data

US 2024/0265032 A1      Aug. 8, 2024

Related U.S. Application Data

(63) Continuation of application No. 18/178,468, filed on Mar. 3, 2023, now Pat. No. 11,989,207, which is a continuation of application No. 17/098,039, filed on Nov. 13, 2020, now Pat. No. 11,630,843.

(51) Int. Cl.
*G06F 16/27*       (2019.01)
*G06F 16/182*      (2019.01)

*G06F 16/215*      (2019.01)
*G06F 16/2455*     (2019.01)

(52) U.S. Cl.
CPC .......... *G06F 16/273* (2019.01); *G06F 16/182* (2019.01); *G06F 16/215* (2019.01); *G06F 16/2456* (2019.01)

(58) Field of Classification Search
CPC .... G06F 16/273; G06F 16/182; G06F 16/215; G06F 16/2456; H04L 51/216
USPC ....................................................... 707/615
See application file for complete search history.

(56) References Cited

U.S. PATENT DOCUMENTS

| | | | | |
|---|---|---|---|---|
| 10,565,229 | B2 * | 2/2020 | Rogynskyy | ........... G06F 40/295 |
| 10,567,320 | B2 * | 2/2020 | Chalakudi | ............... H04L 51/23 |
| 10,949,842 | B1 * | 3/2021 | Lee | ...................... G06Q 20/388 |
| 11,019,090 | B1 * | 5/2021 | Smith | ................. H04L 63/1425 |
| 2014/0280638 | A1 * | 9/2014 | O'Dell | ................... H04L 51/212 |
| | | | | 709/206 |
| 2015/0088798 | A1 * | 3/2015 | Lee | ...................... G06Q 20/388 |

(Continued)

*Primary Examiner* — Hicham Skhoun
(74) *Attorney, Agent, or Firm* — Foley & Lardner LLP

(57)               ABSTRACT

Methods and systems are described herein for synchronizing communication records in computer networks. For example, the methods and systems may determine whether or not a first communication relates to a second and generate a recommendation that the communications relate to a single communication. In particular, the methods and systems described herein describe synchronizing communication records in computer networks based on detecting patterns in categories of metadata. For example, the methods and systems retrieve specific types of metadata and compare this metadata between communications in order to synchronize and/or deduplicate them.

20 Claims, 5 Drawing Sheets

(56)     References Cited

U.S. PATENT DOCUMENTS

| | | | |
|---|---|---|---|
| 2016/0180453 A1* | 6/2016 | Caldwell | G06Q 20/14 |
| | | | 705/35 |
| 2018/0052884 A1* | 2/2018 | Kale | G06F 16/242 |
| 2018/0167476 A1* | 6/2018 | Hoffner | H04L 67/55 |
| 2018/0288077 A1* | 10/2018 | Siddiqui | H04L 63/1416 |
| 2019/0116142 A1* | 4/2019 | Chalakudi | H04L 51/046 |
| 2019/0205294 A1* | 7/2019 | Cazin | G06F 16/273 |
| 2019/0205993 A1* | 7/2019 | Rodriguez | H04L 67/535 |
| 2019/0361873 A1* | 11/2019 | Rogynskyy | G06F 16/28 |
| 2019/0377813 A1* | 12/2019 | Funke | G06F 16/2456 |
| 2020/0205002 A1* | 6/2020 | Talwar | H04W 12/06 |
| 2020/0294033 A1* | 9/2020 | Wilson | G06Q 20/0658 |
| 2022/0058516 A1* | 2/2022 | Sarin | G06N 7/01 |
| 2023/0017855 A1* | 1/2023 | Kikinis | H04L 9/0643 |

* cited by examiner

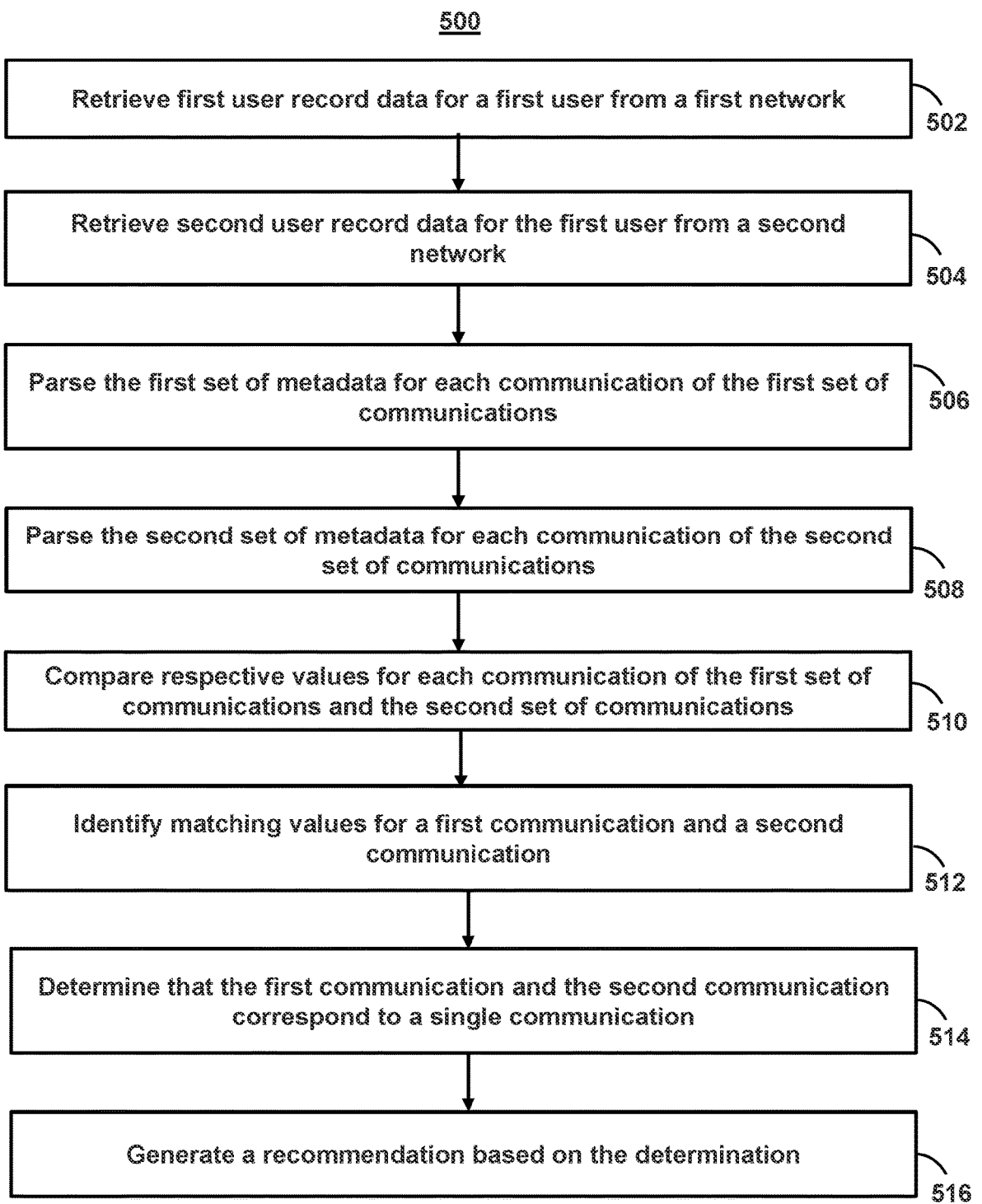

500

Retrieve first user record data for a first user from a first network — 502

Retrieve second user record data for the first user from a second network — 504

Parse the first set of metadata for each communication of the first set of communications — 506

Parse the second set of metadata for each communication of the second set of communications — 508

Compare respective values for each communication of the first set of communications and the second set of communications — 510

Identify matching values for a first communication and a second communication — 512

Determine that the first communication and the second communication correspond to a single communication — 514

Generate a recommendation based on the determination — 516

FIG. 5

METHODS AND SYSTEMS FOR SYNCHRONIZING COMMUNICATION RECORDS IN COMPUTER NETWORKS BASED ON DETECTING PATTERNS IN CATEGORIES OF METADATA

CROSS-REFERENCE TO RELATED APPLICATIONS

This application is a continuation of U.S. patent application Ser. No. 18/178,468, filed Mar. 3, 2023, which is a continuation of U.S. patent application Ser. No. 17/098,039, filed Nov. 13, 2020, now U.S. Pat. No. 11,630,843 issued Apr. 18, 2023. The content of the foregoing application is incorporated herein in its entirety by reference.

FIELD OF THE INVENTION

The invention relates to synchronizing communication records in computer networks based on detecting patterns in categories of metadata.

BACKGROUND INFORMATION

In recent years, the amount and number of communications, and in particular, records for those communications have increased exponentially. Furthermore, in many instances, communications may need to be synchronized based on its relation to another communication. For example, a first communication (e.g., a first email) may need to be linked to a second communication (e.g., a second email that is a copy of the first). In another example, a record of a first communication (e.g., transactional data related to a service) may need to be linked to a second communication (e.g., additional transactional data related to a service).

SUMMARY

Methods and systems are described herein for synchronizing communication records in computer networks. For example, the methods and systems may determine whether or not a first communication relates to a second and generate a recommendation that the communications relate to a single communication. Conventional systems that attempt to synchronize communications may look for a match between specific metadata (e.g., a time stamp); however, in many cases, two communications may have differing time stamps despite relating to each other. Alternatively, other metadata that is more static, such as an identifier related to a sender or receiver of the communication, may match other communications despite the communications not relating to each other. That is, some metadata values may be repeatedly used for different communications (e.g., several emails sent by the same sender, but to different recipients) and/or entities related to a communication. Because of this reuse, these types of metadata are unreliable for synchronizing communications.

To overcome these problems, the methods and systems described herein describe synchronizing communication records in computer networks based on detecting patterns in categories of metadata. For example, the methods and systems retrieve specific types of metadata and compare this metadata between communications in order to synchronize, deduplicate, and/or resolve these communications into their counterparts. Notably, on an individual level none of the specific types of metadata accurately detect that two communications are related. However, by finding a pattern in this data, the system can accurately detect that two communications are related. For example, while a system may not be able to accurately deduplicate and/or resolve a first communication and a second communication based on a match on any one of these metadata types (e.g., without generate false-positives), the system may do so accurately based on matching the pattern and thus resolve the communications into communication counterparts using a database join function.

Furthermore, by limiting the amount of data that must be compared to the selected types, the system processes record data more quickly and thus generates recommendations on related communications more quickly. Beyond simply processing data faster, the system is also enabled to function on a cloud-based, big data framework (e.g., function on a cloud-based, big data framework (e.g., functioning on an Elastic MapReduce ("EMR")). More specifically, the system is compatible with an architecture that runs on Hadoop Distributed File System, which is highly fault-tolerant and is designed to be deployed on low-cost hardware. Thus, this system provides high throughput access to application data and is suitable for applications that have large data sets (e.g., big data applications). Furthermore, the system is fully compatible with the use of task nodes to add processing power to perform parallel computation tasks on the communications.

Accordingly, the system can scale with an increase in communications without reduced performance.

In one aspect, methods and systems for synchronizing communication records in computer networks based on detecting patterns in categories of metadata as described. For example, the system may retrieve first user record data for a first user from a first network, wherein the first user record data comprises a first set of metadata for a first set of communications of the first user during a predetermined time period, and wherein the first set of metadata comprises a respective set of field categories for each communication of the first set of communications. For example, the system may retrieve second user record data for the first user from a second network, wherein the second user record data comprises a second set of metadata for a second set of communications of the first user during the predetermined time period, and wherein the second set of metadata comprises the respective set of field categories for each communication of the second set of communications. For example, the system may parse the first set of metadata for each communication of the first set of communications to identify an account identifier field, an authorization code field, and a network identifier field. For example, the system may parse the second set of metadata for each communication of the second set of communications to identify the account identifier field, the authorization code field, and the network identifier field. For example, the system may compare respective values of the account identifier field, the authorization code field, and the network identifier field for each communication of the first set of communications and each communication of the second set of communications. For example, the system may identify a first communication of the first set of communications and a second communication of the second set of communications with matching values in the account identifier field, the authorization code field, and the network identifier field. In response to determining that each of the respective values of the account identifier field, the authorization code field, and the network identifier field for the first set of metadata and the second set of metadata match, the system may determine that the first communication and the second communication correspond to a single communication. The system may generate for display, on a user interface, a recommendation based on determining that the first communication and the second communication correspond to the single communication.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 5 shows a flowchart of the steps involved in synchronizing communication records in computer networks based on based on detecting patterns in categories of metadata, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
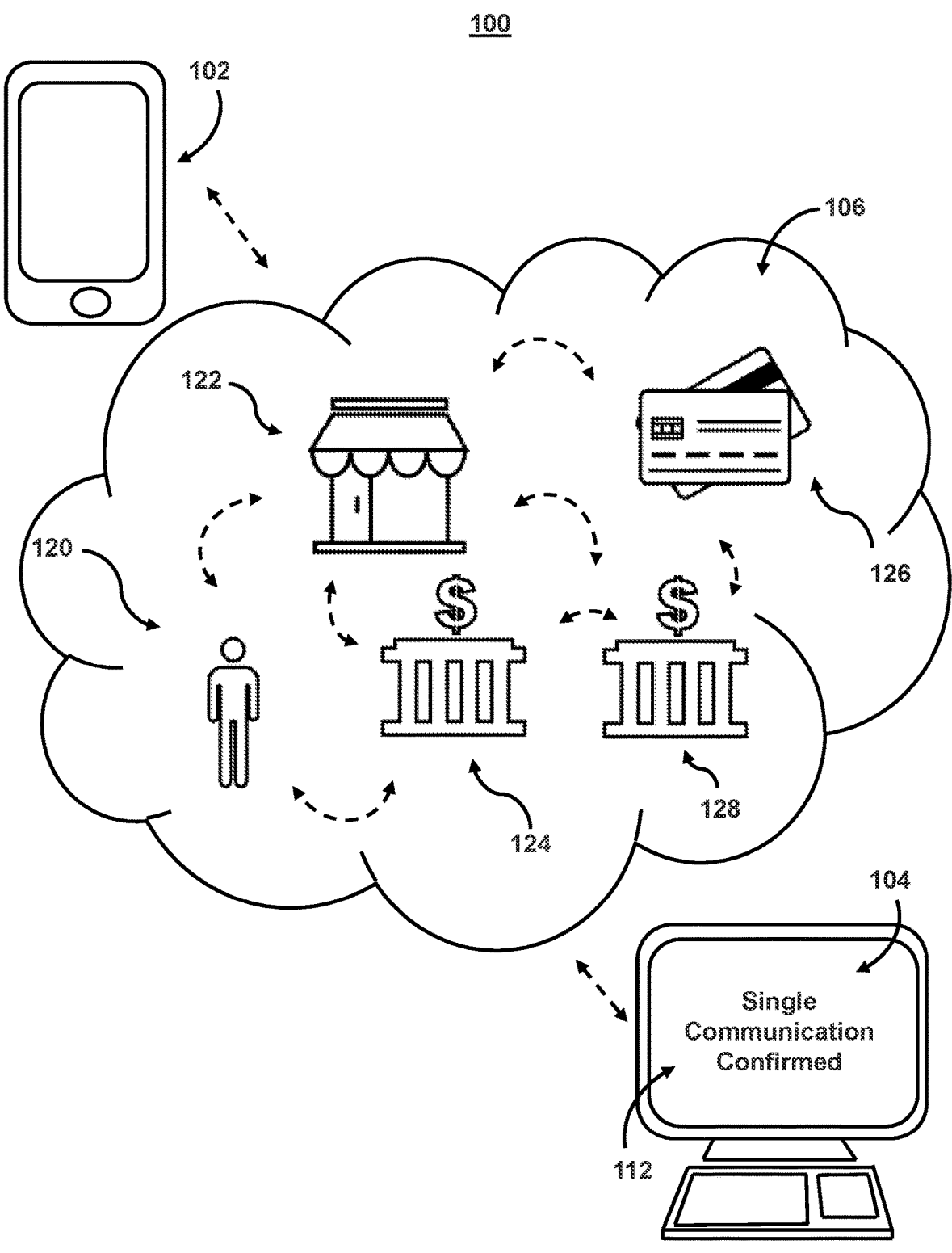
FIG. 1 shows an illustrative diagram for synchronizing communication records in computer networks based on based on detecting patterns in categories of metadata, in accordance with one or more embodiments.

FIG. 1 shows an illustrative diagram for synchronizing communication records in computer networks based on based on detecting patterns in categories of metadata, in accordance with one or more embodiments. As shown in FIG. 1, system 100 may include mobile device 102, user terminal 104, and cloud server 106. It should be noted that each component of system 100 may include additional subcomponents (e.g., additional servers and/or networks). System 100 may be used to aggregate user record data, resolve conflicts, generate user queries, compare source (e.g., merchant) data, and/or generate similarity metrics. For example, the cloud server 106 may include the ecosystem that generates the user data records that need to be synchronized. While shown as a smartphone and personal computer, respectively, in FIG. 1, it should be noted that mobile device 102 and user terminal 104 may be any computing device, including, but not limited to, a laptop computer, a tablet computer, a hand-held computer, other computer equipment (e.g., a server), including "smart," wireless, wearable, and/or mobile devices. FIG. 1 also includes cloud server 106. Server 106 may alternatively be any computing device as described above and may include any type of mobile terminal, fixed terminal, or other device. For example, server 106 may be implemented as a cloud computing system and may feature one or more component devices. It should also be noted that system 100 is not limited to three devices. Users may, for instance, utilize one or more other devices to interact with one another, one or more servers, or other components of system 100. It should be noted that, while one or more operations are described herein as being performed by particular components of system 100, those operations may, in some embodiments, be performed by other components of system 100. As an example, while one or more operations are described herein as being performed by components of mobile device 102, those operations may, in some embodiments, be performed by components of server 106. In some embodiments, the various computers and systems described herein may include one or more computing devices that are programmed to perform the described functions. Additionally, or alternatively, multiple users may interact with system 100 and/or one or more components of system 100. For example, in one embodiment, a first user (e.g., a credit card holder, aggregation service, etc.) and a second user (e.g., a merchant/source, a credit card issuer, etc.) may interact with system 100 using two different components.

With respect to the components of mobile device 102, user terminal 104, and server 106, each of these devices may receive content and data via input/output (hereinafter "I/O") paths. Each of these devices may also include processors and/or control circuitry to send and receive commands, requests, and other suitable data using the I/O paths and I/O circuitry. The control circuitry may comprise any suitable processing circuitry. Each of these devices may also include a user input interface and/or user output interface (e.g., a display) for use in receiving and displaying data. For example, as shown in FIG. 1, both mobile device 102 and user terminal 104 include a display upon which to display data (e.g., recommendation 112). Additionally, as mobile device 102 and user terminal 104 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or another suitable program). The application may cause the processors and/or control circuitry to perform operations related to aggregating record data, resolving conflicts (e.g., either transmitting requests between components, receiving requests between components, and/or processing requests between components). For example, the processors may be programmed to provide information processing capabilities in the computing devices. As such, the processors may include one or more digital processors, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination.

In some embodiments, a request to aggregate user record data, resolve conflicts, generate user queries, compare source data, and/or generate similarity metrics may be structured as an API request that includes a URL, body, and method. The API request may correspond to one half of the API request-response cycle between one or more devices and/or applications to complete the request. For example, the system (e.g., mobile device 102 and server 106) may communicate in HTTP (Hyper Text Transfer Protocol) through a request-response cycle. To make a valid request, the requester (e.g., mobile device 102) may include a URL (Uniform Resource Locator), method, list of headers, and/or body. The URL may indicate to server 106 (or other component) what resources to use (e.g., "SynchronizeUser-Record"). The body may contain headers and data. The headers may provide metadata about the request (e.g., the name of the requester, the user account for which access is needed, etc.) and the body may indicate the name of the user for which a request relates.

As referred to herein, user record data may include any data related to a communication. As further referred to herein, a communication may correspond to a transaction (e.g., a credit card transaction). For example, the record data may include a paper or electronic record containing information about the transaction, such as transaction amount, transaction number, transaction date and time, transaction type (deposits, withdrawal, purchase or refund), type of account being debited or credited, card number, identity of the card acceptor (e.g., merchant/source, including source address, identification or serial number, and/or terminal (e.g., name from which the terminal operates)). For example, an exemplary record data for a communication (e.g., transaction) may include:

Account ID: 0123624234
Timestamp: 1/1/2020 01:30:55 AM UTC
Authorization Code: 12JHG32
Price: $77.98
Payment Currency: USD
Card Present: True
Merchant ID: 12345

In some embodiments, the communication may correspond to an authorization transaction in a list of user financial services data (e.g., a credit card statement). For example, the exemplary record date above may correspond to a transaction authorization. For example, the authorized transaction may comprise an authorized amount that is typically identical to the cost of the goods or services charged to a credit or debit card for a single transaction. However, in some cases (e.g., a restaurant bill with a subsequent tip), it may be an amount, such as $1, or an estimated amount, such as $100, that confirms the card is valid or sufficient funds are available. For example, in some embodiments, an authorization may result in an authorization hold, which is a service offered by credit and debit card providers whereby the provider puts a hold of the amount approved by the cardholder, reducing the balance of available funds until the merchant clears the transaction (also called settlement), after the transaction is completed or aborted, or because the hold expires.

In some embodiments, the communication may correspond to a credit card posting. A credit card posting may occur when a cardholder transaction has been settled and recorded with a post date, which is created for all types of credit card transactions including purchases, payments, refunds, and chargebacks. In some embodiments, synchronizing communication records in computer networks based on detecting patterns in categories of metadata may comprise synchronizing a first communication (e.g., corresponding to an authorization) and a second communication (e.g., corresponding to the settlement). For example, an exemplary record data for a settlement corresponding to the authorization communication (e.g., transaction authorization) may include:

Account ID: 0123624234
Timestamp: 1/1/2020 01:45:45 AM UTC
Authorization Code: 12JHG32
Price: $85.00
Payment Currency: USD
Card Present: True
Merchant ID: 12345

As shown above, some metadata related to the communication (e.g., the price) may be different. Accordingly, the system may rely on synchronizing these communication records based on detecting patterns in categories of metadata. It should be noted that as referred to herein a credit card network may include debit cards, e-commerce accounts, source credit, and other electronic payment and/or monetary systems, such as online user currency accounts, cryptocurrencies, credit provider accounts, gift card accounts, etc.

System 100 may also include source 122, which may be associated with a store and/or vendor that sells goods and/or services to the cardholder. Source 122, which may be a merchant, may accept credit card payments. Source 122 may also send card and/or user account information to, and request payment authorization from, an issuing bank of cardholder 120. Source 122 may be assigned information by a network upon registration. That information may include a merchant/source ID, a network name, and an address. The network may further generate a cleansed network name based on a native network name (e.g., a network name based on a proprietary and/or non-public algorithm for generating a network name based on available data of a merchant when the merchant registers with the network).

Source 122 may include an acquiring bank 124, which may also comprise an acquiring processor or service provider. For example, the acquiring bank may receive payment authorization requests from source 122 and send them to issuing bank 128 (which may include, or be a separate entity from, acquiring bank 124). The acquiring bank 124 may then relay a response from issuing bank 128 to source 122. In some embodiments, acquiring bank 124 may be a third-party entity. Acquiring bank 124 may provide a service or device that allows source 122 to accept credit cards as well as send credit card payment details to network 126. Upon receipt, network 126 may forward the payment authorization back to acquiring bank 124.

Network 126 may include entities that operate credit card networks that process credit card payments worldwide and govern interchange fees. In some embodiments, issuing bank 128 may form part of network 126. For example, issuing bank 128 may be a financial institution that issued the credit card involved in the transaction. Issuing bank 128 may receive the payment authorization request from the credit card network and either approve or decline the transaction.

During processing, the components of system 100 may use multiple naming conventions, format, and value types of a category, value, etc. and these may differ from that of the user profile data (as stored on a user device). Server 106 (or other component of system 100) may use matching algorithms that may support exact match techniques and/or partial or "fuzzy" matching logic (e.g., searching for a closest or partial match) to locate alternate spellings, naming conventions, etc. for categories and/or value. For example, a column name associated with user data stored by an aggregation service may be compared to a category and/or value for the issuing bank 128. In another example, metadata associated with user data stored by an aggregation service (e.g., describing a transaction in the account of the user) may be compared to metadata of a corresponding record, entry, category, and/or value for the issuing bank 128. Based on the degree of similarity between the headings, metadata, and/or other data a "similarity metric" may be assigned using any suitable algorithm or weighting logic (e.g., as discussed in relation to FIG. 5).

Exemplary records of source data that may be compared may include:

| Merchant ID: ABC456 | Merchant ID: CAC459 |
|---|---|
| Network name: | Network name: |
| Josh's Board Game Store | JBBoardGame12341 |
| Timestamp: 1/1/2020 | Timestamp: 1/5/2020 |
| 01:30:55 AM UTC | 12:38:55 AM UTC |
| Price: $57.98 | Price: $60.98 |
| Network: Mastercard ™ | Network: Mastercard ™ |

Notably, while price and timestamp information for a respective authorization and statement may differ, the account identifier field, authorization code field, and network identifier field form a pattern that can be used to match the communications. In some embodiments, system 100 may compare data between system components during a transaction. For example, credit card transactions are processed through a variety of platforms, including brick-and-mortar stores, e-commerce stores, wireless terminals, and phone or mobile devices. The entire authorization cycle takes within two to three seconds, and the transaction process includes three stages of authorization, clearing, and settlement, in which clearing and settlement may take place simultaneously. In an authorization stage, source 122 must obtain approval for payment from issuing bank 128. Source 122 may transmit record data that may include: a credit card number, card expiration date, billing address (e.g., for address verification system ("AVS")), a validation card security code ("CVV"), and/or a payment amount.

As the transaction moves through system 100, issuing bank 128 may receive the payment authorization request from network 126. Issuing bank 128 validates the credit card number, checks the amount of available funds, matches the billing address to the one on file and validates the CVV number. Issuing bank 128 approves, or declines, the transaction and sends back an appropriate response to source 122 through system 100 (e.g., via network 126 and/or acquiring bank 124). Source 122 may receive the authorization, and issuing bank 128 may place a hold in the amount of the purchase on the account of cardholder 120. A point-of-sale terminal (e.g., user terminal 104) may send all approved authorizations to be processed in a "batch" (e.g., at the end of a day, accounting period, etc.). Notably, transmitting authorizations in batches increases the need for accurate and precise data and/or conflict resolutions at a high rate of speed.

During the clearing stage, the transaction is posted to both a credit card account of cardholder 120 and source 122. Source 122 then sends the approved authorizations in a batch to acquiring bank 124. Acquiring bank 124 then routes the batched information to network 126 for settlement. Network 126 forwards each approved transaction to an appropriate issuing bank 128. Issuing bank 128 will transfer the funds and may withhold exchange fees. Network 126 may also pay acquiring bank 124 a fee. Issue bank 128 may then post the user record data to an account of cardholder 120.

Thus, a single transaction includes multiple systems each interacting with each other and handling user data that must be stored, transmitted, and verified in a precise manner. In order to ensure precision, each system and/or component of a system may use its own (and in many cases proprietary) encoding mechanisms. Additionally, or alternatively, source 122, assigning bank 124, network 126, and/or issuing bank 128 each transmit a network name (e.g., an identification system used by an assigning party to indicate a source (e.g., source 122) corresponding to a transaction. However, as each system may use a private (and likely proprietary) algorithm for facilitating transactions, a network name generated and used by one component (e.g., network 126) may not be the same as the network name used by another network.

In some embodiments, other information may vary as well. For example, information about a source (e.g., address) may not be updated and/or correspond to a particular location, corporate headquarters, or other address for all transactions with the source. Likewise, time stamp information may be transmitted in different formats (or correspond to different time zones). Payment information may have slight variations due to fees charged by different system components. In such cases, the system may reconstitute the original charge made by the user (e.g., cardholder 120) based on exchange fee information.

Figure 2:
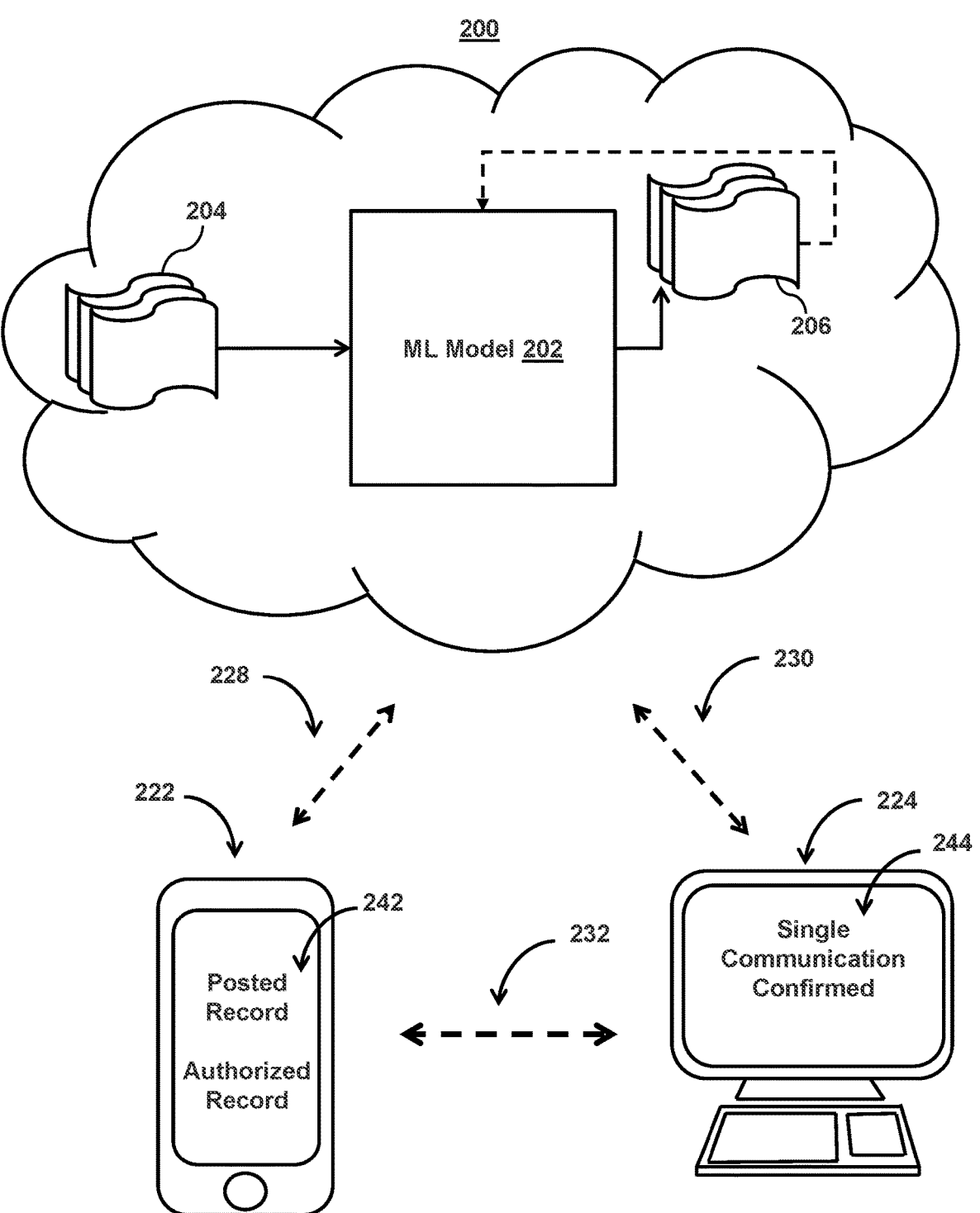
FIG. 2 shows an illustrative system for synchronizing communication records in computer networks based on based on detecting patterns in categories of metadata, in accordance with one or more embodiments.

FIG. 2 shows an illustrative system for synchronizing communication records in computer networks based on based on detecting patterns in categories of metadata, in accordance with one or more embodiments. As shown in FIG. 2, system 200 may include user device 222, user device 224, and/or other components. Each user device may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data (e.g., recommendation 112 (FIG. 1)). By way of example, user device 222 and user device 224 may include a desktop computer, a server, or other client device. Users may, for instance, utilize one or more of the user devices to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of user device 222, those operations may, in some embodiments, be performed by components of user device 224. System 200 also includes machine learning model 202, which may be implemented on user device 222 and user device 224, or accessible by communication paths 228 and 230, respectively. It should be noted that, although some embodiments are described herein with respect to machine learning models, other prediction models (e.g., statistical models or other analytics models)

may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

For example, in some embodiments, system 200 may represent a cloud based system that includes multiple cloud-based components for providing a software development version control system for monitoring contributor performance for source code programming projects. The cloud-based system may include components such as memory, control circuitry, and/or I/O circuitry. The cloud-based memory may be configured to store first user record data for a first user from a first network, wherein the first user record data comprises a first set of metadata for a first set of communications of the first user during a predetermined time period, and wherein the first set of metadata comprises a respective set of field categories for each communication of the first set of communications and second user record data for the first user from a second network, wherein the second user record data comprises a second set of metadata for a second set of communications of the first user during the predetermined time period, and wherein the second set of metadata comprises the respective set of field categories for each communication of the second set of communications. The cloud-based control circuitry may be configured to parse the first and second set of metadata for each communication of the first set of communications and second set of communications, respectively, compare this metadata, and identify matches in that data. For example, system 200 may match communications 242 to generate recommendation 244.

FIG. 2 also includes communication paths 228, 230, and 232. Communication paths 228, 230, and 232 may include the Internet, a mobile phone network, a mobile voice or data network (e.g., a 4G or LTE network), a cable network, a public switched telephone network, or other types of communications network or combinations of communications networks. Communication paths 228, 230, and 232 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As an example, with respect to FIG. 2, machine learning model 202 may take inputs 204 and provide outputs 206. The inputs may include multiple data sets such as a training data set and a test data set. Each of the plurality of data sets (e.g., inputs 204) may include data subsets with common characteristics. In some embodiments, outputs 206 may be fed back to machine learning model 202 as input to train machine learning model 202 (e.g., alone or in conjunction with user indications of the accuracy of outputs 206, labels associated with the inputs, or with other reference feedback information). In another embodiment, machine learning model 202 may update its configurations (e.g., weights, biases, or other parameters) based on the assessment of its prediction (e.g., outputs 206) and reference feedback information (e.g., user indication of accuracy, reference labels, or other information). In another embodiment, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

In some embodiments, machine learning model 202 may include an artificial neural network. In such embodiments, machine learning model 202 may include input layer and one or more hidden layers. Each neural unit of machine learning model 202 may be connected with many other neural units of machine learning model 202. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Machine learning model 202 may be self-learning and trained, rather than explicitly programmed, and can perform significantly better in certain areas of problem solving, as compared to traditional computer programs. During training, an output layer of machine learning model 202 may correspond to a classification of machine learning model 202 and an input known to correspond to that classification may be input into an input layer of machine learning model 202 during training. During testing, an input without a known classification may be input into the input layer, and a determined classification may be output.

In some embodiments, machine learning model 202 may include multiple layers (e.g., where a signal path traverses from front layers to back layers). In some embodiments, back propagation techniques may be utilized by machine learning model 202 where forward stimulation is used to reset weights on the "front" neural units. In some embodiments, stimulation and inhibition for machine learning model 202 may be more free flowing, with connections interacting in a more chaotic and complex fashion. During testing, an output layer of machine learning model 202 may indicate whether or not a given input corresponds to a classification of machine learning model 202 (e.g., determine a first length of programming time based on a determined average length of programming time for a given first resolution type).

Figure 3:
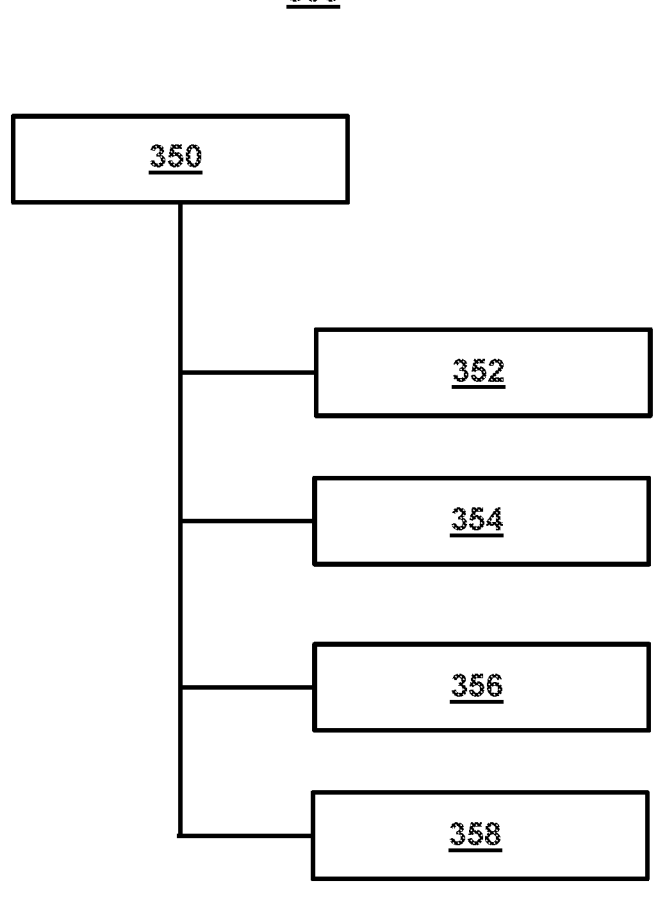
FIG. 3 shows an illustrative data structure for synchronizing communication records in computer networks based on based on detecting patterns in categories of metadata, in accordance with one or more embodiments.

FIG. 3 shows a flowchart of the steps involved in generating credit card transactions for presentation in an aggregated list in accordance with one or more embodiments. For example, FIG. 3 shows data structure 300. As used herein the "data structure" can be embodied in arrays, tables, objects, or other suitable data storage constructs. For example, a multidimensional array as a whole can be the data structure with columns or rows corresponding to the representative fields. Similarly, an instance of an object can be stored, with the representative fields being object properties.

The data structure may include, for example, respective fields (352-358) for record 350 for a communication. This unique data structure, at least by virtue of its architecture containing numerous respective fields, can thus provide an avenue for matching communications. However, it is contemplated that additional respective fields could be included as needed to describe the communication (e.g., weight, processing parameters, device model, etc.), with the above data structure's representative fields being exemplary. Furthermore, not all of the above representative fields are required in a particular data structure, and thus any combination of representative fields can be associated with a given data structure. The disclosed data structure above, and others disclosed elsewhere in this application, can be used with any of the embodiments disclosed in the application, in addition to other embodiments as readily envisaged by a person of skill.

Record 350 may include fields (352-358). Field 352 may correspond to account identifier field. Field 354 may correspond to the authorization code field. Field 356 may correspond to the network identifier field. Field 358 may correspond to one or more other types of metadata. In some embodiments, the account identifier field may comprise texts string of numerical data (e.g., the account identifier field may comprise an account identifier for a financial service or other account). The authorization code field may comprise recurring text strings of alphanumeric text strings. For example, the authorization code field may comprise authorization codes are used for any transaction or entry that has restrictions on which users are entitled to access. For example, a credit card authorization code is a five- or six-number code from the issuing bank to the vendor, that authorizes the sale. Notably, the authorization code may be repeated (e.g., the same) for any transaction involving the same bank, etc. The network identifier field may comprise text strings of fifteen to twenty alphanumeric characters. For example, the network identifier field may comprise a merchant category code ("MCC"), which may be a number that major credit card networks assign to every business that applies to accept credit cards. The number corresponds to the type of business or service the company offers. Credit card networks use MCCs to categorize and track purchases. When a purchase is added to your statement, the category assigned to it, such as "grocery stores, supermarkets," is tied to the merchant category code.

This unique data structure, at least by virtue of its architecture containing numerous respective fields, can thus provide a comprehensive description of the communication. However, it is contemplated that additional respective fields could be included as needed to describe the communication (e.g., weight, processing parameters, device model, etc.), with the above data structure 300 representative fields being exemplary. Furthermore, not all of the above representative fields are required in a particular data structure, and thus any combination of representative fields can be associated with a given data structure. The disclosed data structure above, and others disclosed elsewhere in this application, can be used with any of the embodiments disclosed in the application, in addition to other embodiments as readily envisaged by a person of skill.

For example, record 350 may comprise a column of data corresponding to an authorization. For example, the authorized transaction columns:

```
ACCT_ID
AUTHZN_APPRL_CD
VISA_BANKNET_TRXN_ID/INCRMTL_BANKNET_TRXN_ID
```

Additionally and/or alternatively, record 350 may comprise a column of data corresponding to a posted transaction. For example, the posted transaction columns:

```
ACCT_ID
AUTHZN_CD
VISA_PMT_SVC_TRXN_ID/MC_BANKNET_REFNC_NUM
```

The system may then perform a deduplication application using a database join function. A join function may be a string-based function and may return a string in which the elements of sequence have been joined by str separator. In some embodiments, the system may perform an inner join. The inner join may select all rows from both participating tables as long as there is a match between the columns. A Sequel ("SQL") inner join is same as a join clause, combining rows from two or more tables. For example, an inner join of A and B gives the result of A intersect B, i.e., the inner part of a Venn diagram intersection. In some embodiments, the join function may be an outer join. For example, in an outer join the keyword returns all matching records from both tables whether the other table matches or not. For example, if there are rows in "Customers" that do not have matches in "Orders," or if there are rows in "Orders" that do not have matches in "Customers," those rows will be listed as well.

For example, for a given date ("D"), the system first collects all the transactions that posted (or settled) on D. Next, the system then collects the authorizations for the 30 days leading up to D (most authorizations settle within 7 days, but we consider an entire month to ensure greater coverage). The system then de-duplicate these authorizations. The system then creates a join spec using account ID, authorization code, Visa/MC transaction identifiers. The authorizations over 30 days prior to D are joined with the transactions that posted on D, using this join spec. The result is the authorizations resolved to their posted transaction counterparts.

Figure 4:
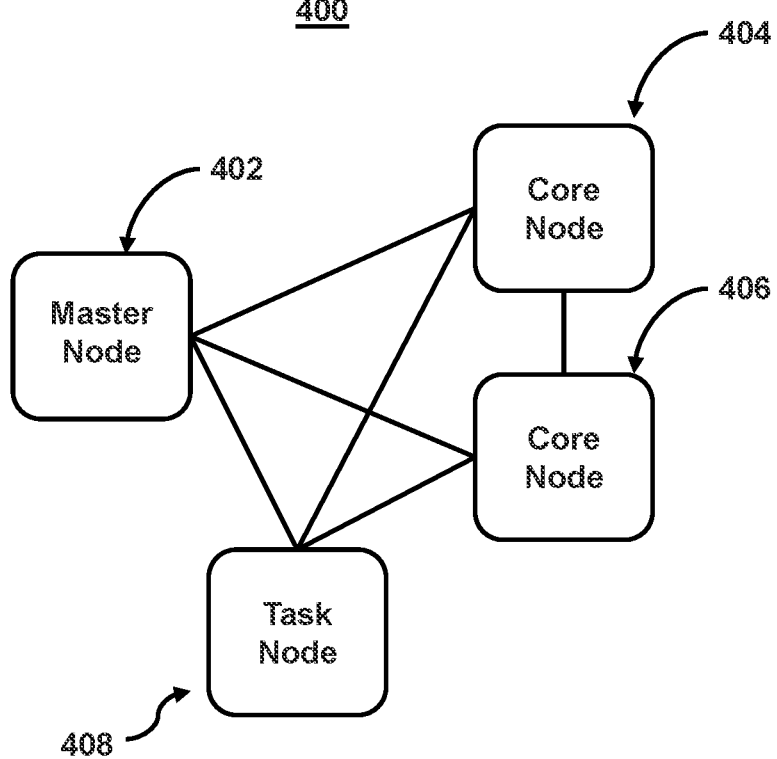
FIG. 4 shows an illustrative system architecture for synchronizing communication records in computer networks based on based on detecting patterns in categories of metadata, in accordance with one or more embodiments.

FIG. 4 shows an illustrative system architecture for synchronizing communication records in computer networks based on based on detecting patterns in categories of metadata, in accordance with one or more embodiments. In some embodiments, the cloud-based big data framework may comprise cloud-based managed cluster platform 400. Beyond simply processing data faster, the system is also enabled to function on a cloud-based, big data framework (e.g., function on a cloud-based, big data framework (e.g., functioning on an Elastic MapReduce ("EMR")). The cloud-based managed cluster platform may further comprise clusters and nodes including master node 402 that manages a cluster by running software components to coordinate a distribution of data and tasks among other nodes for processing. The master node may manage the cluster and typically runs master components of distributed applications. For example, the master node manages resources for applications (e.g., in a Hadoop Distributed File System). For example, the Hadoop Distributed File System is highly fault-tolerant and is designed to be deployed on low-cost hardware. This system also provides high throughput access to application data and is suitable for applications that have large data sets.

For example, cloud-based managed cluster platform 400 comprises clusters and nodes including core node 404 and 406 that may comprise software components that run tasks and store data in a Hadoop Distributed File System for a cluster. For example, core nodes may be managed by the master node. Core nodes run the Data Node daemon to coordinate data storage as part of the Hadoop Distributed File System. They may also run the Task Tracker daemon and perform other parallel computation tasks on data that installed applications require.

Cloud-based managed cluster platform 400 may comprise clusters and nodes including task node 408 that runs tasks and does not store data in a Hadoop Distributed File System for a cluster. In some embodiments, task nodes may be optional and used to add power to perform parallel computation tasks on data.

FIG. 5 shows a flowchart of the steps involved in synchronizing communication records in computer networks based on based on detecting patterns in categories of metadata, in accordance with one or more embodiments. For example, process 500 may represent the steps taken by one or more devices as shown in FIGS. 1-4 when synchronizing communication records in computer networks. For example, a first communication may correspond to a posted communication of a credit card transaction, and a second communication may correspond to an authorization communication of a credit card transaction. For example, the system may synchronize records of these communications such that these communications are de-duplicated and represented (e.g., in a credit card statement) by corresponding to a single communication. In some embodiments, the system may generate a recommendation (e.g., recommendation 244 (FIG. 2)) based on this deduplication.

At step 502, process 500 retrieves (e.g., by control circuitry of one or more of the devices in FIG. 1) first user record data for a first user from a first network. For example, the system may retrieve first user record data for a first user from a first network, wherein the first user record data comprises a first set of metadata for a first set of communications of the first user during a predetermined time period, and wherein the first set of metadata comprises a respective set of field categories for each communication of the first set of communications.

For example, the system may receive a user input setting the predetermined time period. The system may filter the first user record data and the second user record data based on the predetermined time period. For example, the system may allow users to pull records of communications (e.g., credit card transactions) over a given time period (e.g., the last month). As referred to herein, user queries may comprise any graphical, audio, textual, and/or video cue. The query may include a question to the user. For example, the question may be posed as a fill in the blank, multiple choice, reading comprehension, true/false, essay, voice input, etc.

The user may receive the question via reading a user interface of user device (e.g., user device 102 (FIG. 1)) and/or hearing an audio output. The user may likewise input an answer to the question via a user interface of user device (e.g., user device 102 (FIG. 1)).

At step 504, process 500 retrieves (e.g., by control circuitry of one or more of the devices in FIG. 1) second user record data for the first user from a second network. For example, the system may retrieve second user record data for the first user from a second network, wherein the second user record data comprises a second set of metadata for a second set of communications of the first user during the predetermined time period, and wherein the second set of metadata comprises the respective set of field categories for each communication of the second set of communications.

For example, the first user record data and the second user record data may be stored on a cloud-based big data framework. In some embodiments, the cloud-based big data framework may comprise a cloud-based managed cluster platform. The cloud-based managed cluster platform may further comprise clusters and nodes including a master node that manages a cluster by running software components to coordinate a distribution of data and tasks among other nodes for processing. For example, the cloud-based managed cluster platform may comprise clusters and nodes including a core node that may comprise software components that run tasks and store data in a Hadoop Distributed File System for a cluster. For example, the cloud-based managed cluster platform may comprise clusters and nodes including a task node that runs tasks and does not store data in a Hadoop Distributed File System for a cluster.

At step 506, process 500 parses (e.g., by control circuitry of one or more of the devices in FIG. 1) the first set of metadata for each communication of the first set of communications. For example, the system may parse the first set of metadata for each communication of the first set of communications to identify an account identifier field, an authorization code field, and a network identifier field. For example, the first set of metadata may correspond to data structure 300 for record 350 as shown in FIG. 3.

At step 508, process 500 parses (e.g., by control circuitry of one or more of the devices in FIG. 1) the second set of metadata for each communication of the second set of communications to identify the account identifier field, the authorization code field, and the network identifier field. For example, the system may include a plurality of metadata fields as described in FIG. 3.

At step 510, process 500 compares (e.g., by control circuitry of one or more of the devices in FIG. 1) respective values for each communication of the first set of communications and the second set of communications. For example, the system may compare respective values of the account identifier field, the authorization code field, and the network identifier field for each communication of the first set of communications and each communication of the second set of communications.

At step 512, process 500 identifies (e.g., by control circuitry of one or more of the devices in FIG. 1) matching values for a first communication and a second communication. For example, the system may identify a first communication of the first set of communications and a second communication of the second set of communications with matching values in the account identifier field, the authorization code field, and the network identifier field. For example, the system may use multiple types of optical character recognition and/or fuzzy logic, for example, when processing value(s) retrieved from fields related to communications. For example, if the particular data received is textual data, using fuzzy logic, the system (e.g., via a content recognition module or algorithm incorporated into, or accessible by, the system) may determine two fields and/or values to be identical even though the substance of the data or value (e.g., two different spellings) is not identical. In some embodiments, the system may analyze particular received data of a data structure or media asset frame for particular values or text using optical character recognition methods described above in order to synchronize communications. Furthermore, the data could contain values (e.g., the data could be expressed in binary or any other suitable code or programming language).

At step 514, process 500 determines (e.g., by control circuitry of one or more of the devices in FIG. 1) that the first communication and the second communication correspond to a single communication. For example, the system may determine that the first communication and the second communication correspond to a single communication in response to determining that each of the respective values of the account identifier field, the authorization code field, and the network identifier field for the first set of metadata and the second set of metadata match. In some embodiments, the system may further determine a similarity between different values. The system may then determine a match based on the level of similarity.

For example, the first and second values may be extracted from user record data (e.g., as described in FIG. 3). The system may parse each data category value for indicia of a network name (e.g., specific characters, string length, etc.) or based on metadata associated with the source data). For example, in order to generate and better identify potentially matching sources the system may process the network name to remove excess numerals and special characters. For example, the system may identify root words, which are a good indicator of the identity of the source. The system may then match root words without bias towards the order of the root words.

At step 516, process 500 generates (e.g., by control circuitry of one or more of the devices in FIG. 1) a recommendation based on the determination. For example, the system may generate for display, on a user interface (e.g., a user interface of device 102 (FIG. 1)), a recommendation based on determining that the first communication and the second communication correspond to the single communication. For example, the system may generate the single communication in a list of aggregated communications. The list of aggregated communications may represent a plurality of communications (e.g., credit card transactions) that have been synchronized communication records in computer networks based on detecting patterns in categories of metadata.

In some embodiments, the system may determine that the first communication and the second communication correspond to a single communication in response to determining that each of the respective values of the account identifier field, the authorization code field, and the network identifier field for the first set of metadata and the second set of metadata match. The system may then deduplicate the first communication and the second communication based on the match and resolve the first communication and the second communication into communication counterparts using a database join function. The system may then generate for display, on a user interface, a recommendation based on determining that the first communication and the second communication correspond to the single communication based on the database join function.

In some embodiments, the system may also perform additional or alternative functions based on the recommendation. For example, system may generate a user profile of the user. The user profile may include data that is actively or passively compiled on a user. For example, the data may include demographic, geographic, and/or financial data on the user. The data may indicate the preferences, tastes, habits, and/or recent activities of the user (e.g., recent purchases). The user profile may comprise a digital representation of the user. This representation may be organized into a user profile and behaviors of the user, including likely purchases and sources from which purchases were made. The representation may include any information about an event, course of action, or other circumstance related to the user. For example, the scenario may include where a user last shopped, where the user normally shops, what items were purchased, etc. The profile may also include a behavior for the user in the given scenario (e.g., the manner, way, characteristics, and/or any other information about the user's conduct in a scenario). The profile may also include one or more categories in which the user falls. These categories may be used by the system to select other users to compare to the users. The categories may include any information that distinguishes one user from another, or from a group of other users.

The user profile may include data of various types and from various sources. For example, the user profile may include data on credit/debit card purchases, purchasing trends (e.g., where the user spends, what the user buys, how much the user spends), phone call interactions (e.g., how often a user calls, the number called, and the number called from), digital engagement history of the user (e.g., does the user use a mobile app, what devices does the user use, when and how often does the user log in), text/chat history, map and global positioning data (e.g., where the user is located, where the user has been located in the past, areas frequented by a user, distances traveled by a user, where does a user shop, where were purchases of the user, etc.).

The system may record the scenarios, behaviors, and user profiles as records in a database. The records may include fields with particular values corresponding to given behaviors. For example, a value for a behavior related to a shopping scenario may indicate what a user purchased, for how much, or where a user purchased a good or service. In some embodiments, the system may store alphanumeric values (e.g., describing a product that was purchased). For example, a value may in some embodiments include any quantitative or qualitative measure of the behavior of a user in a given scenario.

It should be noted that in some embodiments, the system may also combine response to user queries with one or more matching algorithms and/or machine learning algorithms in order to detect conflicts and/or compare records. For example, the system may retrieve a first value for a first user transaction from a user account and compare the first value to a plurality of values (e.g., corresponding to one or more other user transactions) to identify single transactions. The system may then determine a likelihood of the first value corresponding (e.g., having a first network name) to another value (e.g., having a second network name) and/or a likelihood a first transaction corresponding to another transaction.

This likelihood may be expressed as a similarity metric. As referred to herein, a similarity metric may include a qualitative or quantitative assessment of the similarity of compared data (e.g., compared values, communications, and/or transactions). The similarity metric may be adjusted to provide comparisons of transactions, user record data, source data (including network names or other source data), particular values (e.g., source data category value), responses to user queries and/or any other data that the aggregation service needs to compare to facilitate aggregating user accounts. For example, the system may determine how likely the first value is with respect to another value and generate a similarity metric that represents that relationship. The similarity metric may be expressed as a number, percent, confidence level, grade, score, probability, binary analysis, and/or any other designation used to distinguish how similar the data being compared is. The system may use multiple similarity metrics, each corresponding to a different type of data. Furthermore, each similarity metric may be compared to a threshold specific to that type of data (e.g., as assigned by the aggregation service) in order to identify a match.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for synchronizing communication records in computer networks based on detecting patterns in categories of metadata, the method comprising: retrieving, using a cloud-based managed cluster platform, first user record data for a first user from a first network, wherein the first user record data comprises a first set of metadata for a first set of communications of the first user during a predetermined time period, and wherein the first set of metadata comprises a respective set of field categories for each communication of the first set of communications; retrieving, using the cloud-based managed cluster platform, second user record data for the first user from a second network, wherein the second user record data comprises a second set of metadata for a second set of communications of the first user during the predetermined time period, and wherein the second set of metadata comprises the respective set of field categories for each communication of the second set of communications; parsing, using the cloud-based managed cluster platform, the first set of metadata for each communication of the first set of communications to identify an account identifier field, an authorization code field, and a network identifier field, parsing, using the cloud-based managed cluster platform, the second set of metadata for each communication of the second set of communications to identify the account identifier field, the authorization code field, and the network identifier field; comparing, using the cloud-based managed cluster platform, respective values of the account identifier field, the authorization code field, and the network identifier field for each communication of the first set of communications and each communication of the second set of communications; and identifying, using the cloud-based managed cluster platform, a first communication of the first set of communications and a second communication of the second set of communications with matching values in the account identifier field, the authorization code field, and the network identifier field; in response to determining that each of the respective values of the account identifier field, the authorization code field, and the network identifier field for the first set of metadata and the second set of metadata match, determining, using the cloud-based managed cluster platform, that the first communication and the second communication correspond to a single communication; and generating for display, on a user interface, a recommendation based on determining that the first communication and the second communication correspond to the single communication.

2. The method of embodiment 1, wherein the account identifier field comprises texts string of numerical data, the authorization code field comprises recurring text strings of alphanumeric text strings, and the network identifier field comprises text strings of fifteen to twenty alphanumeric characters.

3. The method of any one of embodiments 1-2, further comprising generating for display the single communication in a list of aggregated communications.

4. The method of any one of embodiments 1-3, further comprising: receiving a user input setting the predetermined time period; and filtering the first user record data and the second user record data based on the predetermined time period.

5. The method of any one of embodiments 1-4, wherein the first user record data and the second user record data are stored on a cloud-based big data framework.

6. The method of any one of embodiments 1-5, wherein the cloud-based managed cluster platform comprises clusters and nodes including a master node that manages a cluster by running software components to coordinate a distribution of data and tasks among other nodes for processing.

7. The method of any one of embodiments 1-6, wherein the cloud-based managed cluster platform comprises clusters and nodes including a core node that comprises software components that run tasks and store data in a Hadoop Distributed File System for a cluster.

8. The method of any one of embodiments 1-7, wherein the cloud-based managed cluster platform comprises clusters and nodes including a task node that runs tasks and does not store data in a Hadoop Distributed File System for a cluster.

9. The method of any one of embodiments 1-8, wherein the first communication corresponds to a posted communication, and wherein the second communication corresponds to an authorization communication.

10. The method of any one of embodiments 1-9, further comprising: deduplicating the first communication and the second communication based on the recommendation; and resolving the first communication and the second communication into communication counterparts using a database join function.

11. A tangible, non-transitory, machine-readable, medium storing instruction that, when executed by a data processing apparatus, causes the data processing apparatus to perform operations comprising those of any of embodiments 1-10.

12. A system comprising: one or more processors and memory storing instructions that, when executed by the processors, cause the processors to effectuate operations comprising those of any of embodiments 1-10.

13. A system comprising means for performing any of embodiments 1-10.

What is claimed is:

1. A system for synchronizing communication records in computer networks based on detecting patterns in categories of metadata, the system comprising:

one or more processors; and a non-transitory, computer-readable medium storing instructions that, when executed by the one or more processors, cause operations comprising:

training a machine learning model using a training data set;

generating a first set of patterns for a first set of metadata associated with a first set of communications and a second set of patterns for a second set of metadata associated with a second set of communications, wherein each pattern in the first set of patterns is associated with a corresponding communication in the first set of communications and wherein each pattern in the second set of patterns is associated with the corresponding communication in the second set of communications;

inputting the first set of patterns and the second set of patterns into the machine learning model, wherein the machine learning model determines a likelihood that a first pattern of the first set of patterns matches a second pattern from the second set of patterns, and wherein the first pattern is not identical to the second pattern;

based on receiving, from the machine learning model, matching patterns from the first set of patterns and the second set of patterns, identifying a first communication of the first set of communications that matches a second communication of the second set of communications;

generating an indication of a match based on determining that the first communication and the second communication correspond to a single communication;

deduplicating the first communication and the second communication based on the indication of the match; and resolving the first communication and the second communication into communication counterparts.

2. A method for synchronizing communication records in computer networks based on detecting patterns in categories of metadata, the method comprising:

generating a first set of patterns for a first set of metadata associated with a first set of communications and a second set of patterns for a second set of metadata associated with a second set of communications, wherein each pattern in the first set of patterns is associated with a corresponding communication in the first set of communications and wherein each pattern in the second set of patterns is associated with the corresponding communication in the second set of communications;

training a machine learning model using a training data set;

inputting the first set of patterns and the second set of patterns into the machine learning model, wherein the machine learning model determines a likelihood that a first pattern of the first set of patterns matches a second pattern from the second set of patterns, and wherein the first pattern is not identical to the second pattern;

based on receiving, from the machine learning model, matching patterns from the first set of patterns and the second set of patterns, identifying a first communication of the first set of communications that matches a second communication of the second set of communications;

generating an indication of a match based on determining that the first communication and the second communication correspond to a single communication;

deduplicating the first communication and the second communication based on the indication of the match; and resolving the first communication and the second communication into communication counterparts.

3. The method of claim 2, wherein the first set of metadata comprises a respective set of field categories for each communication of the first set of communications and wherein a first value of a first field category of the respective set of field categories comprises text strings of numerical data, a second value of a second field category of the respective set of field categories comprises recurring text strings of alphanumeric text strings, and a third value of a third field category of the respective set of field categories comprises text strings of fifteen to twenty alphanumeric characters.

4. The method of claim 2, further comprising generating for display the single communication in a list of aggregated communications.

5. The method of claim 2, further comprising:

receiving a user input setting a predetermined time period; and filtering the first set of metadata and the second set of metadata based on the predetermined time period.

6. The method of claim 2, wherein the first set of metadata and the second set of metadata are stored on a cloud-based big data framework.

7. The method of claim 2, wherein the second set of metadata is retrieved using a cloud-based managed cluster platform comprising clusters and nodes including a master node that manages a cluster by running software components to coordinate a distribution of data and tasks among other nodes for processing.

8. The method of claim 2, wherein the second set of metadata is retrieved using a cloud-based managed cluster platform comprising clusters and nodes including a core node that comprises software components that run tasks and store data in a Hadoop Distributed File System for a cluster.

9. The method of claim 2, wherein the second set of metadata is retrieved using a cloud-based managed cluster platform comprising clusters and nodes including a task node that runs tasks and does not store data in a Hadoop Distributed File System for a cluster.

10. The method of claim 2, wherein the first communication corresponds to a posted communication, and wherein the second communication corresponds to an authorization communication.

11. The method of claim 2, wherein resolving the first communication and the second communication into the communication counterparts comprises resolving the first communication and the second communication into the communication counterparts using a database join function.

12. One or more non-transitory computer-readable media storing instructions that, when executed by one or more processors, cause operations comprising:

generating a first set of patterns for a first set of metadata associated with a first set of communications and a second set of patterns for a second set of metadata associated with a second set of communications, wherein each pattern in the first set of patterns is associated with a corresponding communication in the first set of communications and wherein each pattern in the second set of patterns is associated with the corresponding communication in the second set of communications;

training a machine learning model using a training data set;

inputting the first set of patterns and the second set of patterns into the machine learning model, wherein the machine learning model determines a likelihood that a first pattern of the first set of patterns matches a second pattern from the second set of patterns, and wherein the first pattern is not identical to the second pattern;

based on receiving, from the machine learning model, matching patterns from the first set of patterns and the second set of patterns, identifying a first communication of the first set of communications that matches a second communication of the second set of communications;

generating an indication of a match based on determining that the first communication and the second communication correspond to a single communication;

deduplicating the first communication and the second communication based on the indication of the match; and resolving the first communication and the second communication into communication counterparts.

13. The one or more non-transitory computer-readable media of claim 12, wherein the first set of metadata comprises a respective set of field categories for each communication of the first set of communications and wherein a first value of a first field category of the respective set of field categories comprises text strings of numerical data, a second value of a second field category of the respective set of field categories comprises recurring text strings of alphanumeric text strings, and a third value of a third field category of the respective set of field categories comprises text strings of fifteen to twenty alphanumeric characters.

14. The one or more non-transitory computer-readable media of claim 12, further comprising generating for display the single communication in a list of aggregated communications.

15. The one or more non-transitory computer-readable media of claim 12, further comprising:

receiving a user input setting a predetermined time period; and filtering the first set of metadata and the second set of metadata based on the predetermined time period.

16. The one or more non-transitory computer-readable media of claim 12, wherein the first set of metadata and the second set of metadata are stored on a cloud-based big data framework.

17. The one or more non-transitory computer-readable media of claim 12, wherein the second set of metadata is retrieved using a cloud-based managed cluster platform comprising clusters and nodes including a master node that manages a cluster by running software components to coordinate a distribution of data and tasks among other nodes for processing.

18. The one or more non-transitory computer-readable media of claim 12, wherein the second set of metadata is retrieved using a cloud-based managed cluster platform comprising clusters and nodes including a core node that comprises software components that run tasks and store data in a Hadoop Distributed File System for a cluster.

19. The one or more non-transitory computer-readable media of claim 12, wherein the second set of metadata is retrieved using a cloud-based managed cluster platform comprising clusters and nodes including a task node that runs tasks and does not store data in a Hadoop Distributed File System for a cluster.

20. The one or more non-transitory computer-readable media of claim 12, wherein resolving the first communication and the second communication into the communication counterparts comprises resolving the first communication and the second communication into the communication counterparts using a database join function.

* * * * *